(12) United States Patent
Henon et al.

(10) Patent No.: US 10,324,289 B1
(45) Date of Patent: Jun. 18, 2019

(54) VIBRATION COMPENSATING HEAD-UP DISPLAY

(71) Applicant: VISTEON GLOBAL TECHNOLOGIES, INC., Van Buren Township, MI (US)

(72) Inventors: Fabrice Henon, Cergy (FR); Sebastien Hervy, Liancourt Saint Pierre (FR); David Renaudin, Us (FR)

(73) Assignee: Visteon Global Technologies, INC., Van Buren Township, MI (US)

( * ) Notice: Subject to any disclaimer, the term of this patent is extended or adjusted under 35 U.S.C. 154(b) by 11 days.

(21) Appl. No.: 15/841,612

(22) Filed: Dec. 14, 2017

(51) Int. Cl.
*G02B 27/01* (2006.01)
*F16F 15/00* (2006.01)

(52) U.S. Cl.
CPC ........ *G02B 27/0101* (2013.01); *F16F 15/002* (2013.01); *G02B 27/0149* (2013.01); *G02B 2027/0183* (2013.01)

(58) Field of Classification Search
CPC ... G03B 27/01; G03B 27/0101; G03B 27/646
See application file for complete search history.

(56) References Cited

U.S. PATENT DOCUMENTS

| 7,513,637 | B2 | 4/2009 | Kelly et al. |
| 7,978,414 | B2 | 7/2011 | Potakowskyj et al. |
| 2016/0266391 | A1* | 9/2016 | Han ........................ G09G 3/001 |
| 2018/0267304 | A1* | 9/2018 | Sasaki ................ G02B 27/0101 |

* cited by examiner

*Primary Examiner* — William C. Dowling
(74) *Attorney, Agent, or Firm* — Quinn IP Law

(57) ABSTRACT

A system and method for canceling vibrations in a head-up display device displaying a projected image superimposed over a field of view of a driver of a vehicle includes a mounting plate fixed to the vehicle and supporting a combiner panel while allowing the combiner panel to be rotated about a rotation axis. An image source generates a signal corresponding to the projected image, which is then projected upon the combiner panel by a picture generating unit. A rotation sensor measures rotation of the combiner panel and causes a displacement compensation controller to shift the projected image to offset displacement caused by vibration which would otherwise cause the projected image to appear to move. In this way, unwanted movement of the projected image caused by vibration is effectively cancelled-out. Alternative arrangements of components of the system are disclosed. A method for vibration cancellation in a HUD device is also provided.

17 Claims, 9 Drawing Sheets

VIBRATION COMPENSATING HEAD-UP DISPLAY

BACKGROUND

It is known from the state of the art how to project information in the field of sight of a user, such as, for example, a driver or a pilot, by means of a head-up display, or HUD.

One common problem with HUDs is visible disturbances in the image that can result from vibrations that move parts of the HUD such as the combiner. This is especially problematic in vehicular applications, particularly when the vehicle is operating on rough or uneven surfaces such as dirt roads. As a consequence, the projected image can be difficult to be read when the vehicle is running on rough roads. Other sources of vibration such as those that can result from worn and/or unbalanced powertrain components may similarly cause vibrations that result in visible disturbances in a HUD image.

There exists a need for a vibration compensating head-up display device that minimizes visible disturbances caused by vibrations.

SUMMARY

A vibration compensating head-up display device for displaying a projected image superimposed over a field of view of a driver of a vehicle is provided. The head-up display device including an image source generating a signal corresponding to the projected image, a picture generating unit (PGU) generating a light beam to display the projected image upon the combiner panel, and a rotation sensor measuring rotation of the combiner panel about the rotation axis and causing a displacement compensation controller to shift the projected image from a nominal position to a shifted position to offset a displacement of the combiner panel.

A method for compensating for vibrations in a head-up display device is also provided. The method includes the steps of providing a combiner panel coupled to a mounting plate and rotatable relative thereto about a rotation axis, generating a projected image by an image source, and projecting the projected image upon the combiner panel. In order to compensate for vibrations affecting the combiner panel, the method proceeds with the steps of measuring rotation of the combiner panel about the rotation axis by a rotation sensor, and shifting the projected image to a shifted position by a displacement compensation controller in response to the measured rotation of the combiner panel.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figures 1A, 1B:
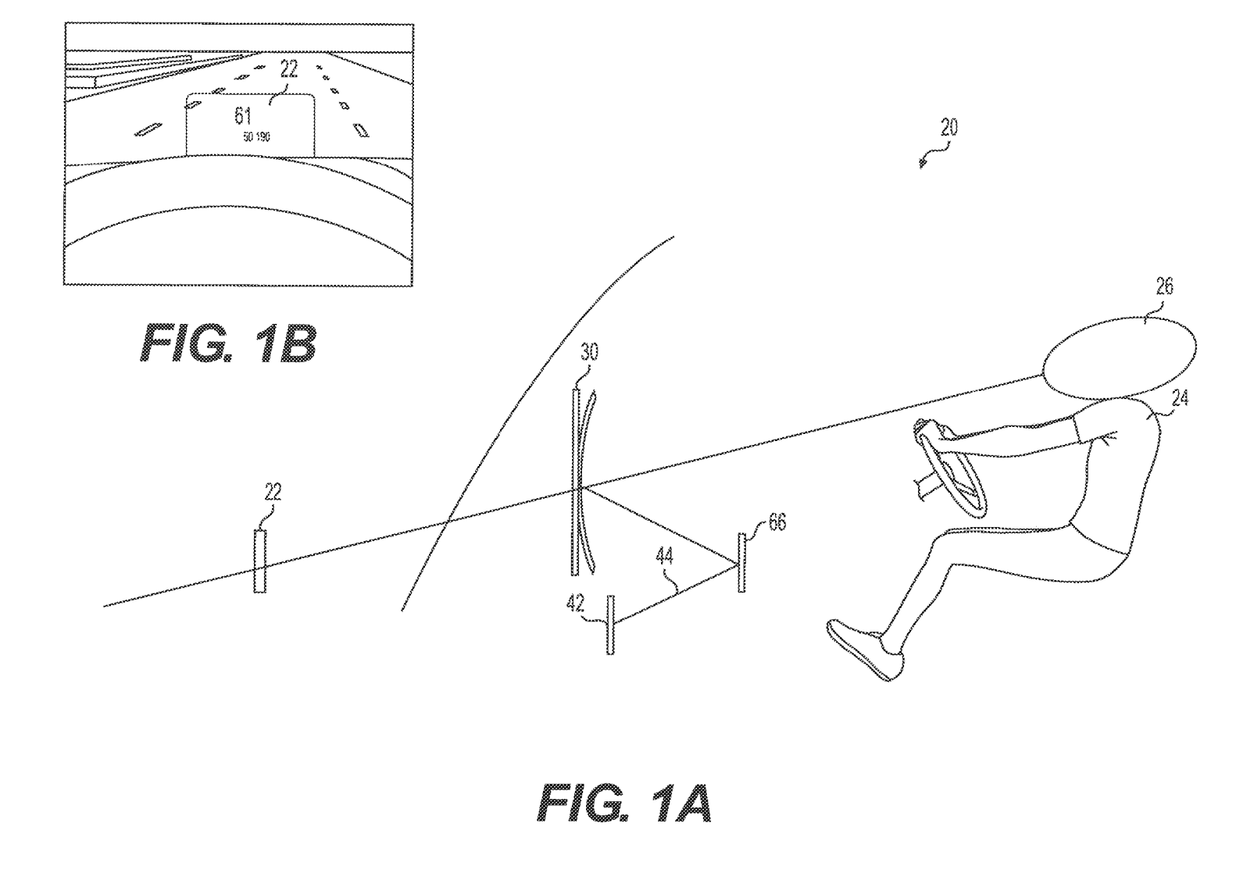
FIG. 1A is a schematic side view of a vibration compensating head-up display device.
FIG. 1B is a is a viewer's perspective showing a projected image superimposed over a field of view.

Referring to the Figures, wherein like numerals indicate corresponding parts throughout the several views, a vibration compensating head-up display device 20 is provided. As shown in FIGS. 1A-1B, the head-up display device 20 displays a projected image 22 superimposed over a field of view of a driver 24 of a vehicle located at an elliptical eye region of space 26 representing a range of normal viewing positions.

Figure 2A:
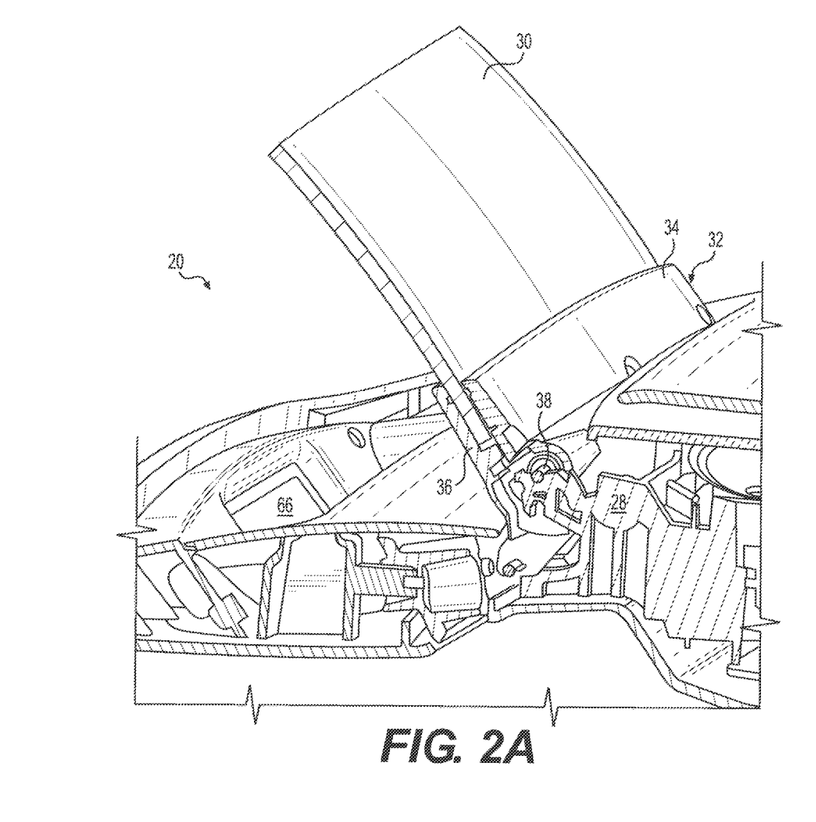
FIG. 2A is a cut-away side view of a vibration compensating head-up display device.
Figure 2B:
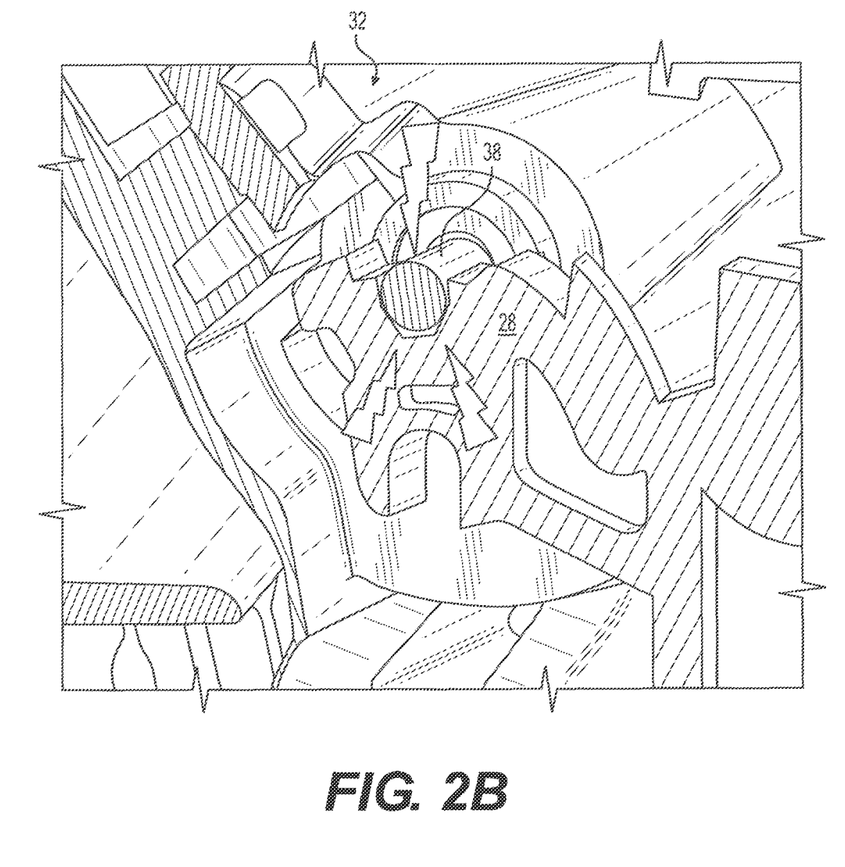
FIG. 2B is an enlarged portion of the cut-away side view of FIG. 2A.

As shown in FIG. 2A-2B, the vibration compensating head-up display device 20 includes a mounting plate 28 fixed to the vehicle and supporting a combiner panel 30 of semi-transparent material to display the projected image 22 overlying the field of view. A support 32 including an upper portion 34 and a lower portion 36 sandwiches the combiner panel 30, holding it in an upright operating position. An axle 38 extends horizontally from the upper portion 34 coupling the combiner panel 30 to the mounting plate 28 and defining a rotation axis A to allow the combiner panel 30 to be rotated relative to the mounting plate 28. Such rotation of the combiner panel 30 may allow it to be tilted to different positions for adjusting the location of the projected image 22 within the field of view of the driver 24. Such a tilting functionality may be used, for example, to allow drivers 24 of different heights to adjust the location of the projected image 22 overlying their field of view. The combiner panel 30 may also be rotated about the rotation axis A between an upright operational position and a retracted position when the head-up display device 20 is not in operation.

As illustrated in FIG. 2B, vibrations may also cause the combiner panel 30 to rotate relative to the mounting plate 28. Such unwanted rotation may cause the resulting image to appear to move or shake.

Figure 3:
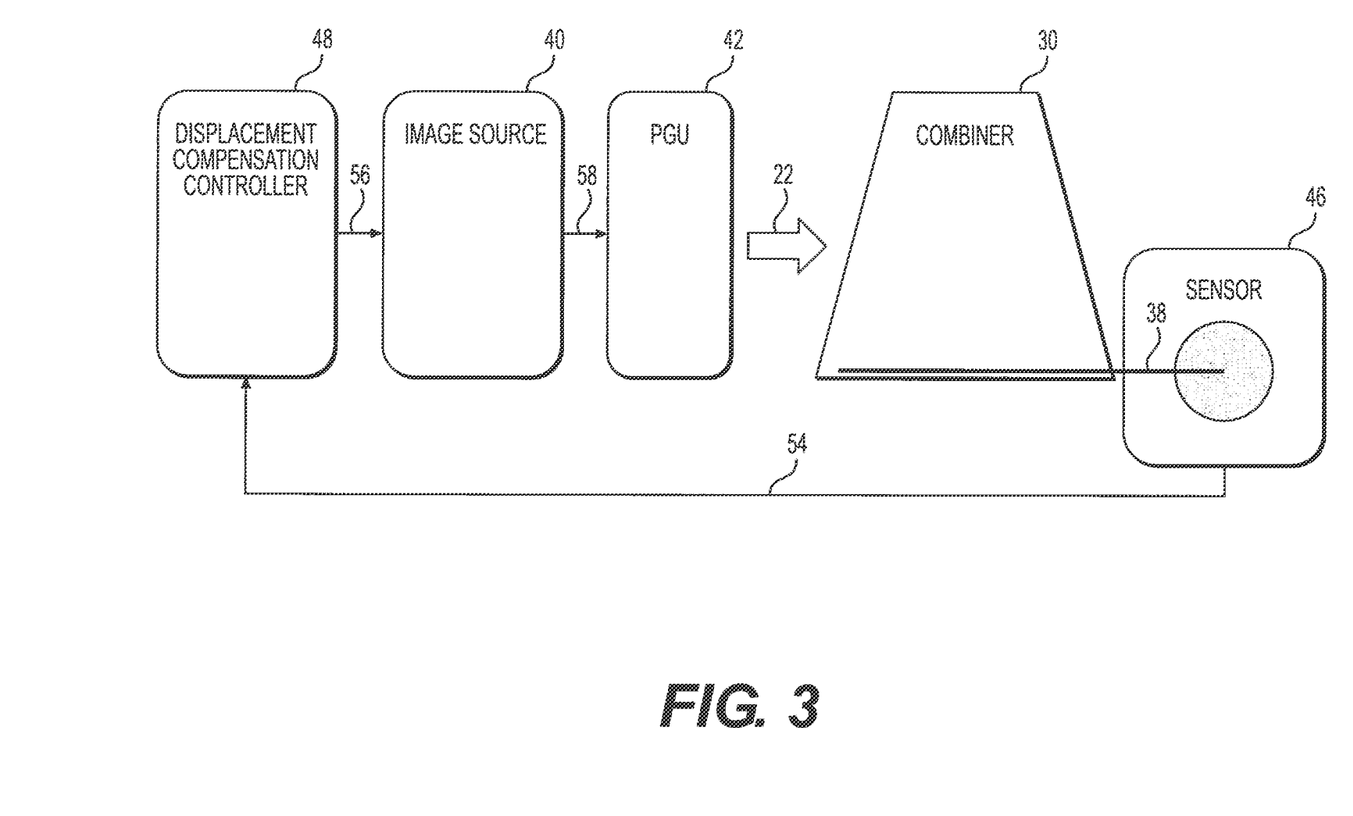
FIG. 3 is a block diagram of one embodiment of a vibration compensating head-up display device.

As shown in FIG. 3, the vibration compensating head-up display device 20 includes an image source 40 generating a signal corresponding to the projected image 22. The image source 40 may, for example, be a graphic processor to provide graphical images, numeric, text, or visual images to be displayed by the head-up display. The head-up display device 20 also includes picture generating unit 42 (PGU) in communication with the image source 40 and generating a light beam 44 to display the projected image 22 upon the combiner panel 30. The picture generating unit 42 may include, for example, a Liquid Crystal on Silicon (LCoS) SLM device as well as one or more illumination sources such as LEDs, lasers or light bulbs.

The vibration compensating head-up display device 20 also includes a rotation sensor 46 measuring rotation of the combiner panel 30 about the rotation axis A resulting from vibrations and causing a displacement compensation controller 48 to shift the projected image 22 from a nominal position 50 to a shifted position 52 to offset a displacement of the combiner panel 30 caused by vibration and which would otherwise cause the projected image 22 to appear to move. In this way, unwanted movement of the projected image 22 caused by vibration is effectively cancelled-out.

According to the embodiment shown in FIG. 3, the rotation sensor 46 communicates a rotation signal 54 to the displacement compensation controller 48 which generates a shifting command 56 which is communicated to the image source 40. The displacement compensation controller 48 may, for example, determine the timing and the placement of the shifted position 52, which may be based on, for example, an analysis of the frequency and amplitude of the rotation signal 54. The image source 40 then generates and transmits a compensated signal 58, including the projected image 22 in the shifted position 52. The picture generating unit 42 receives that compensated signal 58, which it uses to generate and project the projected image 22 onto the combiner panel 30.

Figure 4:
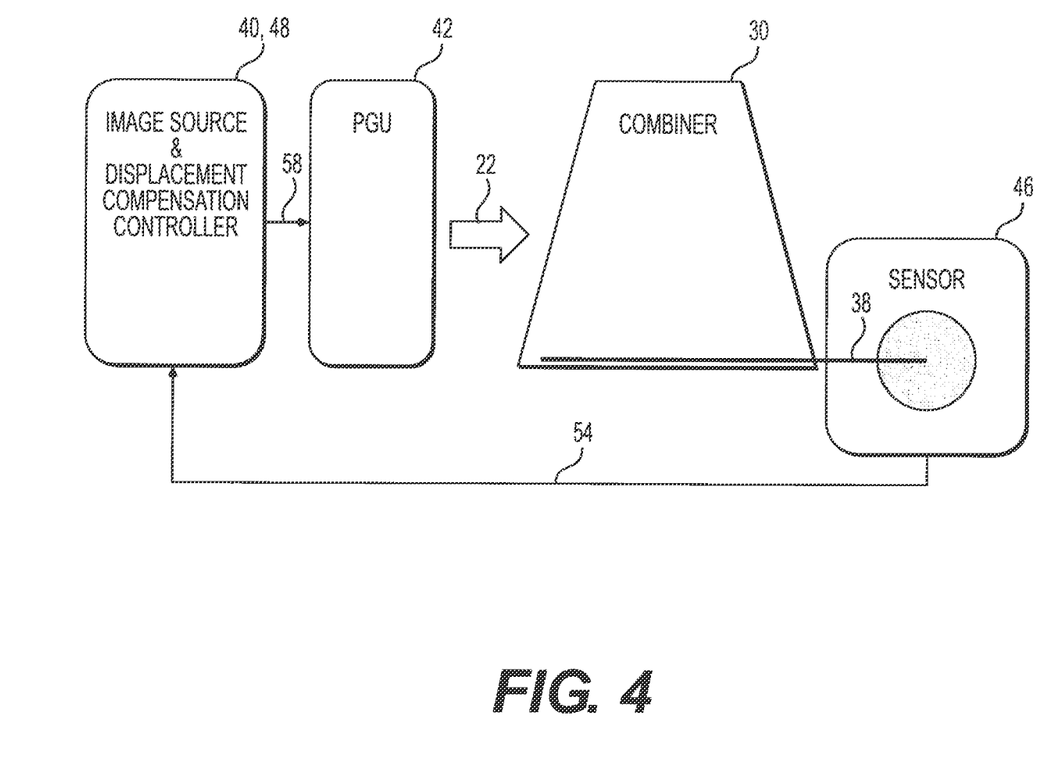
FIG. 4 is a block diagram of another embodiment of a vibration compensating head-up display device.

According to an alternate embodiment, and as shown in FIG. 4, the displacement compensation controller 48 may be functionally combined with the image source 40 such that the image source 40 then generates and transmits the compensated signal 58 in response to the rotation signal 54 from the rotation sensor 46. In other words, the intermediate step of generating a shifting command 56 is not required.

Figure 5:
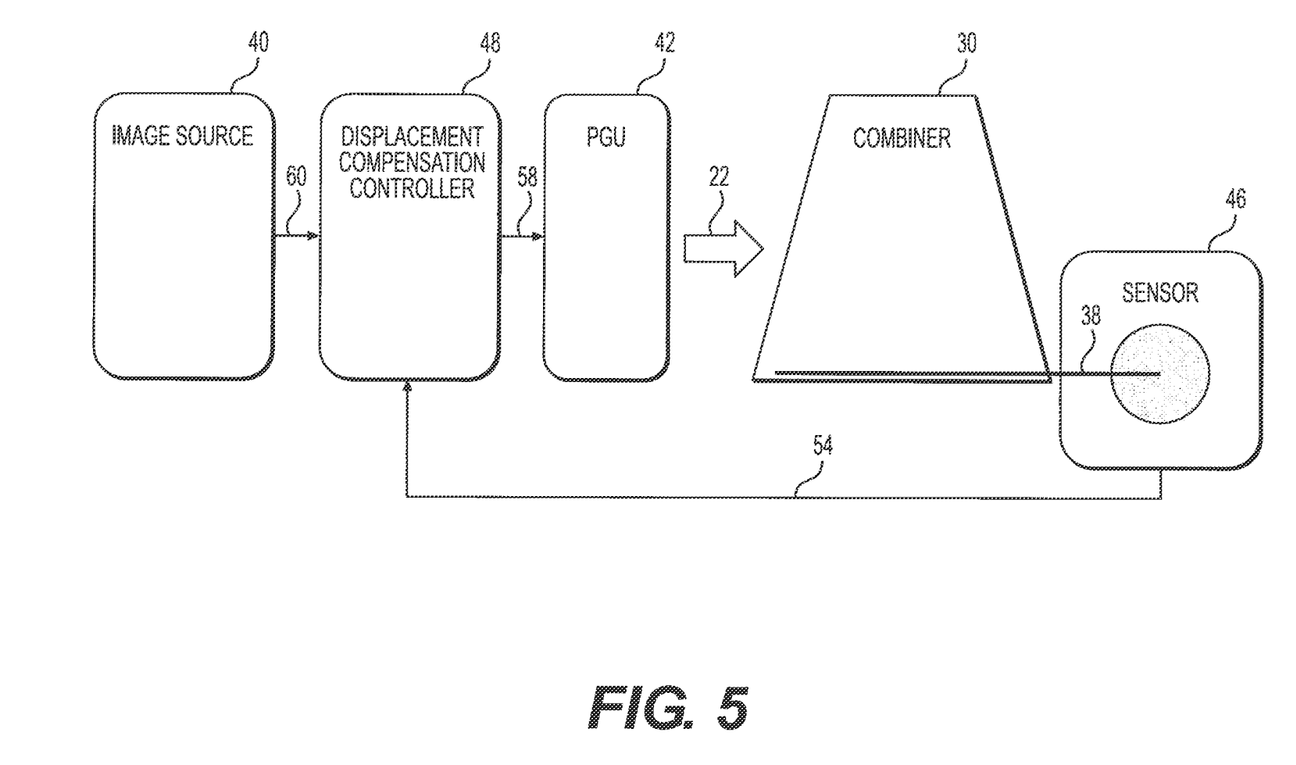
FIG. 5 is a block diagram of another embodiment of a vibration compensating head-up display device.

According to another alternate embodiment and as shown in FIG. 5, the displacement compensation controller 48 may be functionally disposed between the image source 40 and the picture generating unit 42. In this way, the image source 40 generates an uncompensated signal 60, which is subsequently modified by the displacement compensation controller 48 into the compensated signal 58, including the projected image 22 in the shifted position 52.

Figure 6:
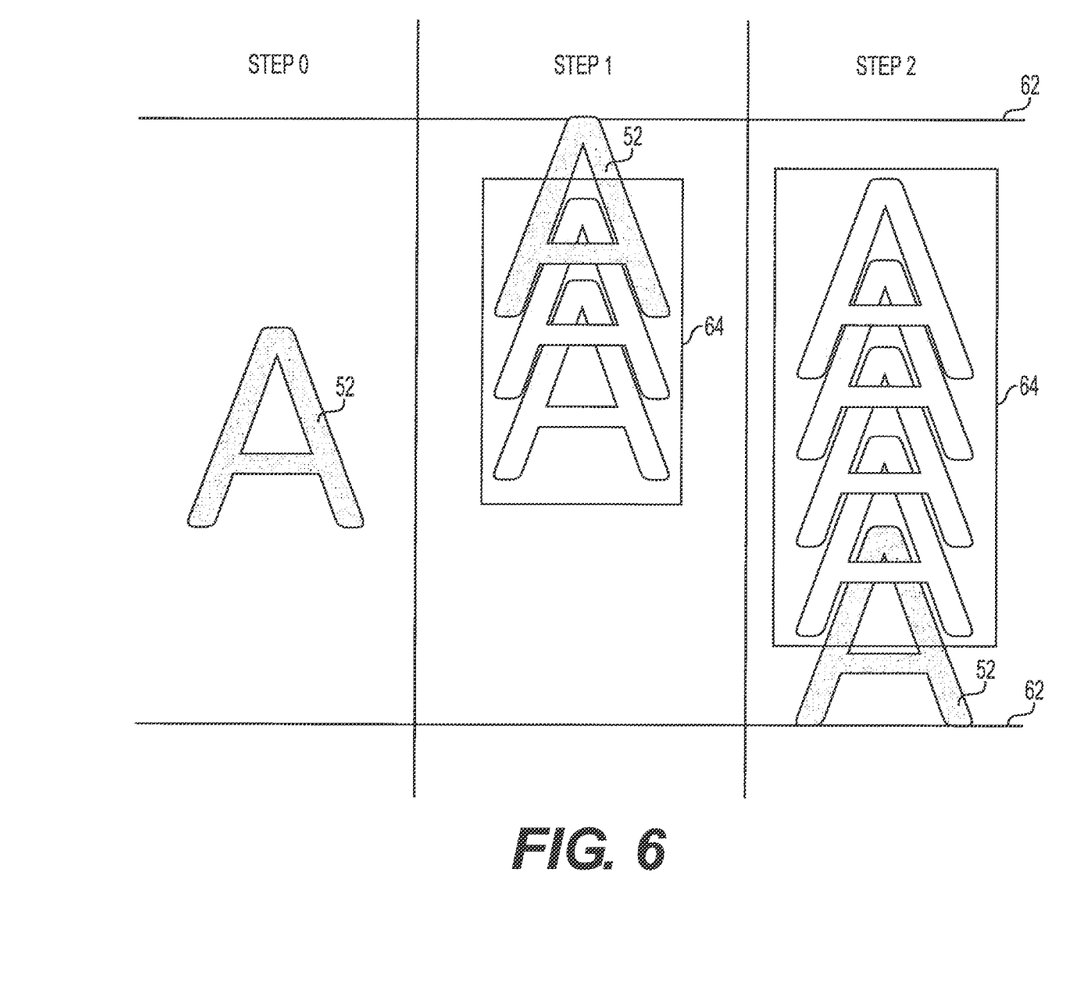
FIG. 6 is a chart showing representative images formed by a vibration compensating head-up display device in three different positions.
Figure 7:
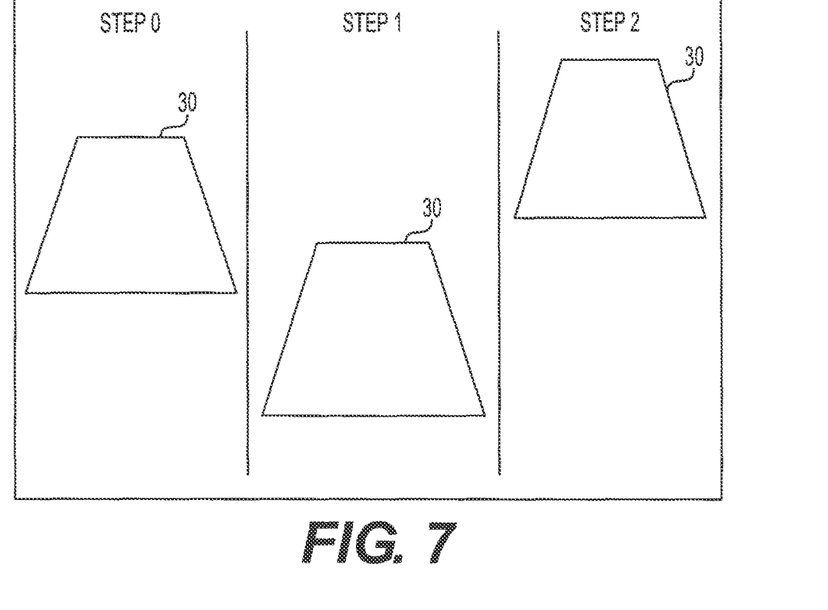
FIG. 7 is a chart showing a combiner panel in three different positions.
Figure 8:
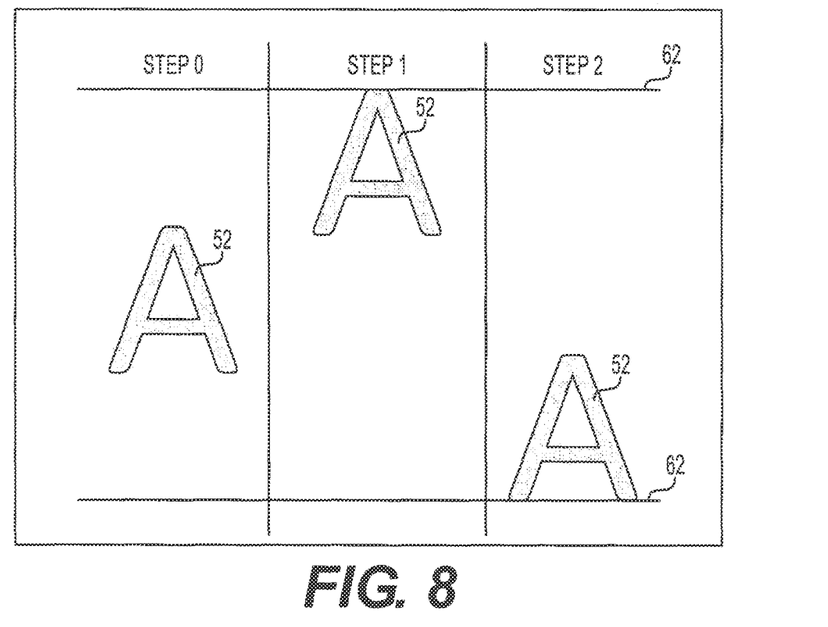
FIG. 8 is a chart showing a representative image formed by a vibration compensating head-up display device in three different positions.

As illustrated in FIG. 6, the shifted position 52 corresponds to a maximum displacement 62 of the combiner panel 30 in either of two opposite directions such as up/down or clockwise/counter-clockwise (CW/CCW) as measured by the rotation sensor 46. The projected image 22 is not displayed at intermediate positions 64 between the nominal position 50 and the maximum displacement 62. For example, and as shown in FIGS. 7-8, with the combiner panel 30 in a neutral position (step 0), the shifted position 52 of the projected image 22 has no offset from the nominal position 50. In other words, the projected image 22 remains in its centered or nominal position 50. If the combiner panel 30 moves to a maximum displacement 62 in a first direction (step 1), the projected image 22 is moved to the shifted position 52 at a maximum distance from the nominal position 50 and in a second direction opposite the displacement of the combiner panel 30. Likewise, if the combiner panel 30 moves to a maximum displacement 62 in a second direction (step 2), the projected image 22 is moved to the shifted position 52 at a maximum distance from the nominal position 50 and in a first direction opposite the displacement of the combiner panel 30. In other words, and as illustrated in FIGS. 7-8, when the combiner panel 30 moves downward, the displacement compensation controller 48 compensates for such movement by shifting the projected image 22 upward so that the projected image 22 appears to the viewer 24 to remain in the same position.

As shown in FIG. 1A, vibration compensating head-up display device 20 may also include a mirror 66 reflecting the light beam 44 from the picture generating unit 42 onto the combiner panel 30 as a folded optical path. Furthermore, the mirror 66 may be concave to enlarge the projected image 22 as the light beam 44 is reflected.

According to an aspect, the rotation sensor 46 may be an angular velocity sensor 46 for measuring the angular velocity of the combiner panel 30 about the rotation axis A. The angular velocity sensor 46 may include a vibration gyro sensor. More specifically, the angular velocity sensor 46 may include a piezoelectric transducer.

Figure 9:
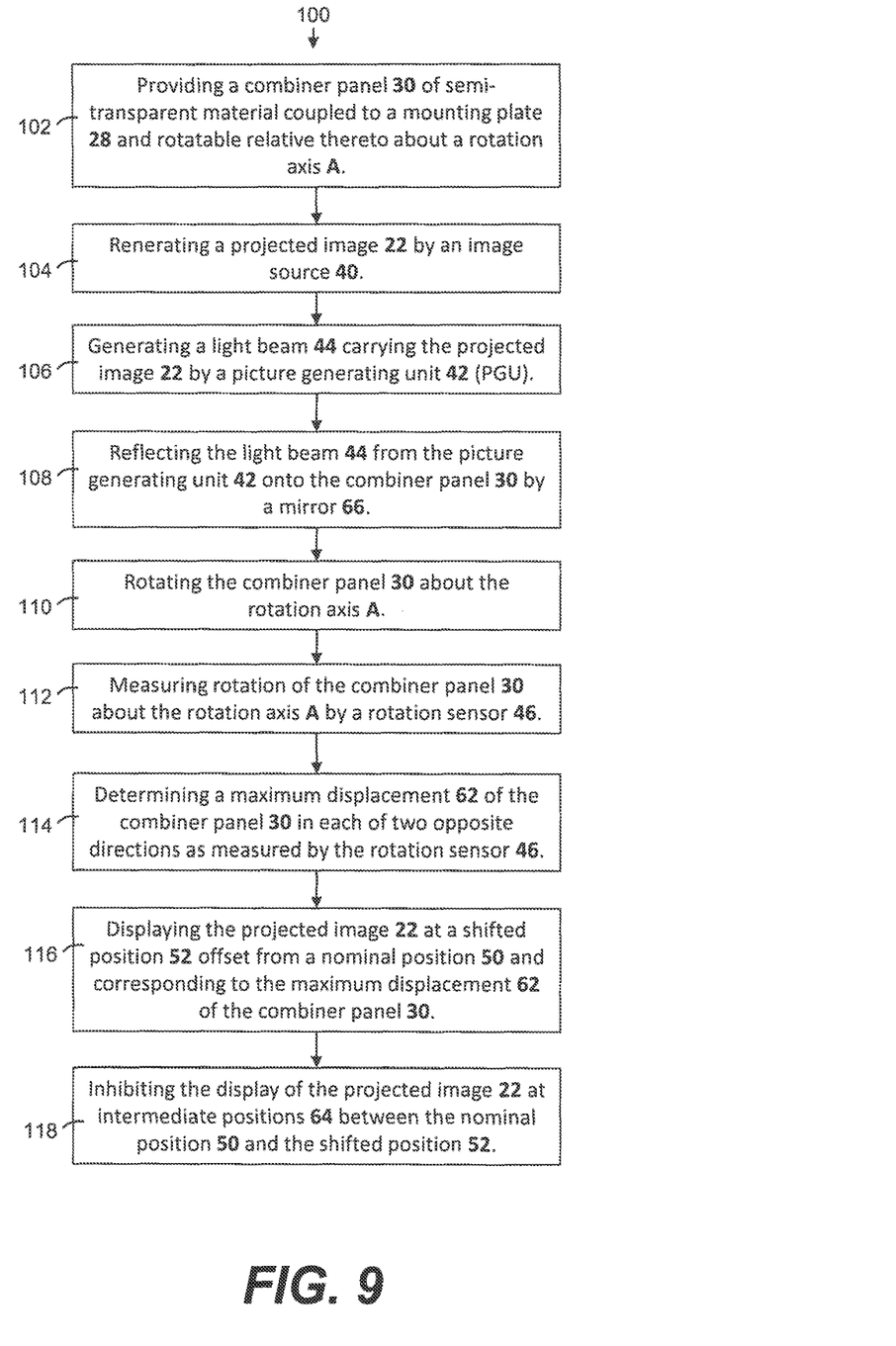
FIG. 9 is a flow chart of a method for compensating for vibrations in a head-up display device 20 is also provided

A method 100 for compensating for vibrations in a head-up display device 20 is also provided. The method 100 includes the steps of 102 providing a combiner panel 30 of semi-transparent material coupled to a mounting plate 28 and rotatable relative thereto about a rotation axis A. For example, and as shown in FIG. 2A, the combiner panel 30 may include one or more axles 38 extending horizontally therefrom to couple the combiner panel 30 to the mounting plate 28 and defining the rotation axis A to allow the combiner panel 30 to be rotated between different positions relative to the mounting plate 28. This ability for the combiner panel 30 to be rotated may have several practical applications including, for example, for adjusting the location of the projected image 22 within the field of view of the driver 24 or for moving the combiner panel 30 between an upright operational position and a retracted position when the head-up display device 20 is not in operation. However, the freedom to rotate may also have adverse effects, such as unwanted rotation or displacement caused by vibrations, which may cause visual shaking or wobbles on the head-up display device 20.

The method 100 includes the step of 104 generating a projected image 22 by an image source 40. The image source 40 may, for example, be a graphic processor to provide graphical images, numeric, text, or visual images to be displayed by the head-up display. The image source 40 may also be a simpler device such as a switched circuit or a digital output signal of a digital controller which may cause a corresponding tell-tale indicator to be illuminated.

The method 100 also includes 106 generating a light beam 44 carrying the projected image 22 by a picture generating unit 42 (PGU). The picture generating unit 42 may include, for example, a Liquid Crystal on Silicon (LCoS) SLM device as well as one or more illumination sources such as LEDs, lasers or light bulbs. The picture generating unit 42 may be as simple as an applique or a shape of a symbol defined by the difference in transparency of different materials which may be selectively illuminated to cause a corresponding telltale symbol to be displayed.

The method 100 proceeds with 108 reflecting the light beam 44 from the picture generating unit 42 onto the combiner panel 30 by a mirror 66. The mirror 66 therefore results in the light beam 44 having a folded optical path between the picture generating unit 42 and the combiner panel 30, which may allow for a more compact packing, which may allow the vibration compensating head-up display device 20 to fit within a given space such as within the dash of a vehicle. Furthermore, the mirror 66 may be concave to enlarge the projected image 22 as the light beam 44 is reflected.

The method 100 also includes 110 rotating the combiner panel 30 about the rotation axis A. Such rotation of the combiner panel 30 may allow it to be tilted to different positions for adjusting the location of the projected image 22 within the field of view of the driver 24. Tilting functionality may be used, for example, to allow drivers 24 of different heights to adjust the location of the projected image 22 overlying their field of view. The combiner panel 30 may also be rotated about the rotation axis A between an upright operational position and a retracted or lowered position when the head-up display device 20 is not in operation, which may protect the combiner panel 30 from exposure to detrimental environmental factors such as dust and/or UV radiation from the sun.

The method 100 further includes the step of 112 measuring rotation of the combiner panel 30 about the rotation axis A by a rotation sensor 46. This step may include, for example, determining the rotation of the combiner panel 30 about the rotation axis A by measuring the angular velocity of the axle 38 by an angular velocity sensor 46. The angular velocity sensor 46 may include a vibration gyro sensor such as, for example, a piezoelectric vibration gyro sensor.

The method 100 proceeds with the step of 114 determining a maximum displacement 62 of the combiner panel 30 in each of two opposite directions as measured by the rotation sensor 46. The two opposite directions being clockwise and counterclockwise rotation of the combiner panel 30 about the rotation axis A. The maximum displacement 62 may be determined as an averaged maximum value over some time period, which may allow the system to anticipate a maximum displacement that results from regular vibrations such as those having a regular waveform (e.g. a sinusoidal or triangular wave shape). Averaging or filtering the measured rotation values may also help to prevent anomalous or inconsistent operation resulting from inconsistent data from the rotation sensor 46, which may result, for example, from electrical interference or noise.

The method 100 proceeds with the step of 116 displaying the projected image 22 at a shifted position 52 offset from a nominal position 50 and corresponding to the maximum displacement 62 of the combiner panel 30 to compensate for displacement of the combiner panel 30 caused by vibration which would otherwise cause the projected image 22 to appear to move. The shifted position 52 should be configured to offset the change in the position and shape of the projected image 22 that result from the combiner panel 30 being rotated as a result of vibrations. The occurrence of this step is illustrated in FIGS. 7-8.

The method 100 further includes the step of 118 inhibiting the display of the projected image 22 at intermediate positions 64 between the nominal position 50 and the shifted position 52. This step is best illustrated in FIG. 6. This step is intended to prevent visual anomalies, such as streaking, which could otherwise result from the projected image 22 being shown between the shifted positions 52 and the nominal position 50. Such visual anomalies may be particularly apparent in cases where the displacement compensation controller 48 is not precisely synchronized with actual vibrations of the combiner panel 30 such as, for example, when a vibration begins or those resulting from changing vibrations such as in rapid transitions between different types of terrain.

Obviously, many modifications and variations of the present invention are possible in light of the above teachings and may be practiced otherwise than as specifically described while within the scope of the appended claims.

What is claimed is:

1. A vibration compensating head-up display device for displaying a projected image superimposed over a field of view of a driver of a vehicle, and comprising:
   a mounting plate supporting a combiner panel to display the projected image, and with the combiner panel being rotatable relative to the mounting plate about a rotation axis;
   an image source generating a signal corresponding to the projected image;
   a picture generating unit (PGU) generating a light beam to display the projected image upon the combiner panel; and
   a rotation sensor measuring rotation of the combiner panel about the rotation axis and causing a displacement compensation controller to shift the projected image from a nominal position to a shifted position to offset a displacement of the combiner panel.

2. The vibration compensating head-up display device as set forth in claim 1 wherein the displacement compensation controller provides an adjustment signal to the image source to cause the image source to generate a compensated signal with the projected image in the shifted position in response to rotation of the combiner panel.

3. The vibration compensating head-up display device as set forth in claim 1 wherein the displacement compensation controller is functionally integrated with the image source to cause the image source to generate a compensated signal with the projected image in the shifted position in response to rotation of the combiner panel.

4. The vibration compensating head-up display device as set forth in claim 1 wherein the displacement compensation controller is functionally disposed between the image source and the picture generating unit for modifying an uncompensated signal from the image source to generate a compensated signal and causing the projected image to be shifted to the shifted position in response to rotation of the combiner panel.

5. The vibration compensating head-up display device as set forth in claim 1 wherein the rotation sensor is an angular velocity sensor for measuring the angular velocity of the combiner panel about the rotation axis.

6. The vibration compensating head-up display device as set forth in claim 1 wherein the angular velocity sensor is a vibration gyro sensor.

7. The vibration compensating head-up display device as set forth in claim 6 wherein the angular velocity sensor includes a piezoelectric transducer.

8. The vibration compensating head-up display device as set forth in claim 1 further including an axle coupled to the combiner panel to provide for rotation about the rotation axis.

9. The vibration compensating head-up display device as set forth in claim 1 further including a mirror reflecting the light beam from the picture generating unit onto the combiner panel as a folded optical path.

10. The vibration compensating head-up display device as set forth in claim 8 wherein the mirror is concave to enlarge the projected image as the light beam is reflected.

11. A method for compensating for vibrations in a head-up display device comprising:
   providing a combiner panel coupled to a mounting plate and rotatable relative thereto about a rotation axis;
   generating a projected image by an image source;
   projecting the projected image upon the combiner panel;
   measuring rotation of the combiner panel about the rotation axis by a rotation sensor;
   shifting the projected image to a shifted position by a displacement compensation controller in response to the measured rotation of the combiner panel.

12. The method for compensating for vibrations in a head-up display device as set forth in claim 11 wherein the step of shifting the projected image to a shifted position by a displacement compensation controller further includes displaying the projected image at a shifted position offset from a nominal position and corresponding to a maximum displacement of the combiner panel as measured by the rotation sensor to compensate for displacement of the combiner panel.

13. The method for compensating for vibrations in a head-up display device as set forth in claim 11 further including the step of inhibiting the display of the projected image at intermediate positions between the nominal position and the shifted position.

14. The method for compensating for vibrations in a head-up display device as set forth in claim 11 further including the step of generating a light beam carrying the projected image by a picture generating unit.

15. The method for compensating for vibrations in a head-up display device as set forth in claim 11 further including the steps of:
   providing an adjustment signal by the displacement compensation controller to the image source in response to the rotation of the combiner panel; and
   generating by the image source a compensated signal with the projected image in the shifted position.

16. The method for compensating for vibrations in a head-up display device as set forth in claim 11 further including the steps of:
   functionally integrating the displacement compensation controller with the image source; and
   generating by the image source a compensated signal with the projected image in the shifted position in response to rotation of the combiner panel.

17. The method for compensating for vibrations in a head-up display device as set forth in claim 11 further including the steps of:
   providing said displacement compensation controller in a communication path between said image source and said picture generating unit;
   modifying by said displacement compensation controller an uncompensated signal from said image source to generate a compensated signal and thereby causing the projected image to be shifted to said shifted position in response to rotation of the combiner panel.

* * * * *